(12) United States Patent
Adachi et al.

(10) Patent No.: US 9,012,777 B2
(45) Date of Patent: Apr. 21, 2015

(54) CONDUCTIVE PATH STRUCTURE AND WIRE HARNESS

(75) Inventors: Hideomi Adachi, Kosai (JP); Hidehiko Kuboshima, Kosai (JP)

(73) Assignee: Yazaki Corporation, Tokyo (JP)

( * ) Notice: Subject to any disclaimer, the term of this patent is extended or adjusted under 35 U.S.C. 154(b) by 272 days.

(21) Appl. No.: 13/819,118

(22) PCT Filed: Sep. 16, 2011

(86) PCT No.: PCT/JP2011/071784
§ 371 (c)(1),
(2), (4) Date: Feb. 26, 2013

(87) PCT Pub. No.: WO2012/036321
PCT Pub. Date: Mar. 22, 2012

(65) Prior Publication Data
US 2013/0153294 A1 Jun. 20, 2013

(30) Foreign Application Priority Data
Sep. 16, 2010 (JP) .................. 2010-207548

(51) Int. Cl.
*H01R 3/00* (2006.01)
*B60K 28/14* (2006.01)
*H01B 7/32* (2006.01)
*B60K 28/00* (2006.01)

(52) U.S. Cl.
CPC *H01R 3/00* (2013.01); *B60K 28/14* (2013.01); *B60K 2028/006* (2013.01); *H01B 7/328* (2013.01)

(58) Field of Classification Search
CPC .......................................... H01R 3/00
USPC ....................................... 174/88 R
See application file for complete search history.

(56) References Cited

U.S. PATENT DOCUMENTS

| | | | | |
|---|---|---|---|---|
| 3,830,331 A | * | 8/1974 | Piazza ........................... | 180/282 |
| 2002/0098413 A1 | * | 7/2002 | Hulbert et al. ................ | 429/178 |
| 2005/0011687 A1 | | 1/2005 | Yamaguchi et al. | |

FOREIGN PATENT DOCUMENTS

| | | |
|---|---|---|
| DE | 10017455 A1 | 10/2001 |
| EP | 0724983 A1 | 8/1996 |
| EP | 1440834 A1 | 7/2004 |

(Continued)

OTHER PUBLICATIONS

International Search Report dated Dec. 6, 2011 issued in International Application No. PCT/JP2011/071784 (PCT/ISA/210).
Written Opinion dated Dec. 6, 2011 issued in International Application No. PCT/JP2011/071784 (PCT/ISA/237).

(Continued)

*Primary Examiner* — Timothy Thompson
*Assistant Examiner* — Charles Pizzuto
(74) *Attorney, Agent, or Firm* — Sughrue Mion, PLLC

(57) ABSTRACT

A conductive path structure includes a conductor that includes a first conductive portion and a second conductive portion which are connected to each other through a cut-off facilitating portion, and a semi-solid state insulation member that is in a semi-solid state and covers the cut-off facilitating portion. When the cut-off facilitating portion is cut off so as to separate the first conductive portion and the second conductive portion to each other due to an impact applied to the cut-off facilitating portion, the semi-solid state insulation member covers end portions of the separated first conductive portion and the separated second conductive portion which are close to the cut-out facilitating portion.

6 Claims, 6 Drawing Sheets

(56) References Cited

FOREIGN PATENT DOCUMENTS

| | | | |
|---|---|---|---|
| JP | 2004-224156 A | | 8/2004 |
| JP | 2009081000 | * | 4/2009 |

OTHER PUBLICATIONS

Office Action dated Nov. 3, 2014, issued by the State Intellectual Property Office of P.R. China in counterpart Chinese Application No. 201180044635.6

* cited by examiner

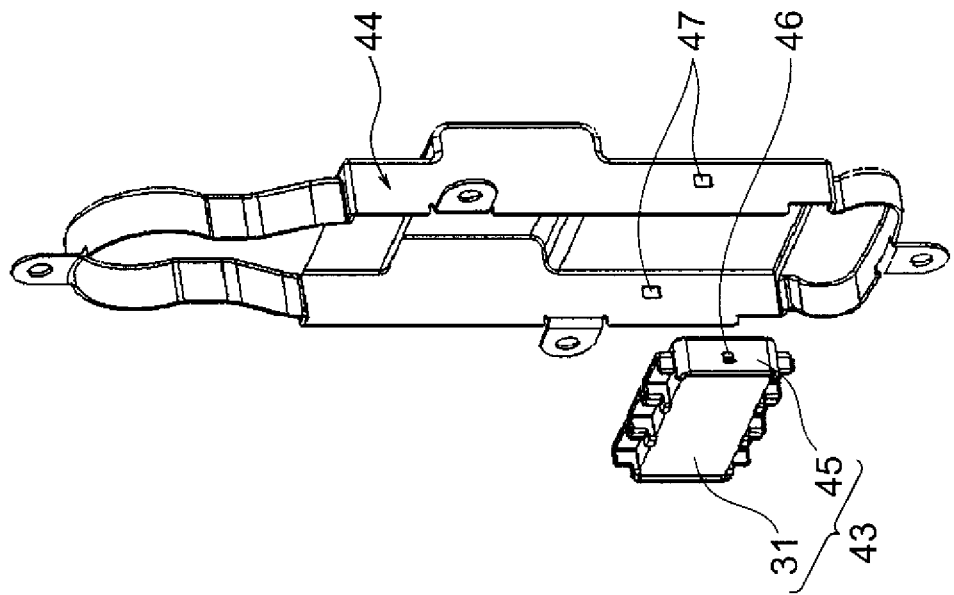
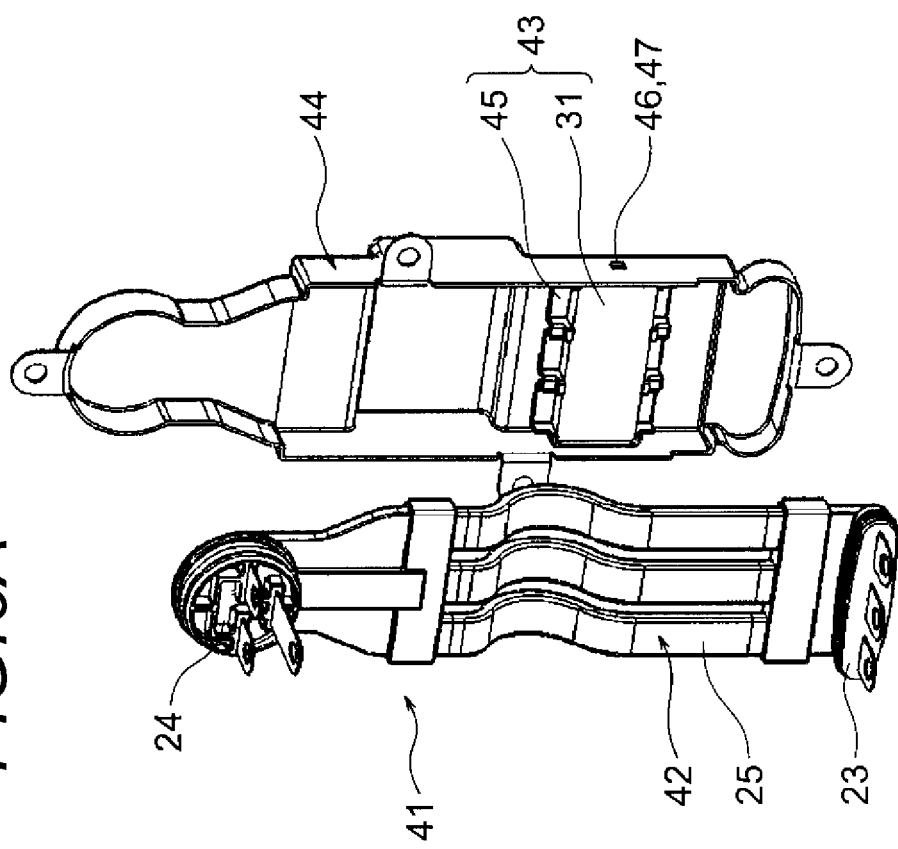

CONDUCTIVE PATH STRUCTURE AND WIRE HARNESS

TECHNICAL FIELD

The present invention relates to a structure of a conductive path including a conductor, and a wire harness including a plurality of conductive paths.

BACKGROUND ART

Recently, hybrid motor vehicles and electric motor vehicles as eco cars have been attracting interest. Furthermore, a distribution rate thereof has increased. Hybrid motor vehicles and electric motor vehicles are equipped with a motor as a power source. In order to drive the motor, there is a need to electrically connect a portion between the battery and the inverter, and a portion between the inverter and the motor by a high voltage wire harness. The high voltage wire harness includes a plurality of high voltage wires that is conductive paths.

A plurality of high voltage wire harnesses is suggested. As an example thereof, there is a wire harness disclosed in Patent Literature 1 described below.

CITATION LIST

Patent Literature

[PTL 1] JP-A-2004-224156

SUMMARY OF INVENTION

Technical Problem

When an impact is applied to the hybrid motor vehicle or the electric motor vehicle from the outside, that is, when a collision or the like occurs, the high voltage wire constituting the wire harness may be cut off. When considering a case where the high voltage wire is cut off, whereby the peeled-out conductor comes into contact with a member having conductivity, device, vehicle body frame or the like, it is evident that great electric current flows into the above conductive member, device vehicle body frame or the like, which is very dangerous.

Solution to Problem

The present invention was made in view of the above circumstances, and an object thereof is to provide a conductive path structure and a wire harness capable of ensuring stability even when the conductive path is cut off.

In order to achieve the above object, according to the present invention, there is a provided conductive path structure comprising:

a conductor that includes a first conductive portion and a second conductive portion which are connected to each other through a cut-off facilitating portion; and a semi-solid state insulation member that is in a semi-solid state and covers the cut-off facilitating portion, wherein when the cut-off facilitating portion is cut off so as to separate the first conductive portion and the second conductive portion to each other due to an impact applied to the cut-off facilitating portion, the semi-solid state insulation member covers end portions of the separated first conductive portion and the separated second conductive portion which are close to the cut-out facilitating portion.

According to the above configuration, when the conductor is cut-off or the like, the outside of the first conductive portion and the second conductive portion (conductor cut-off portions) of the conductive path entering a divided state by the cut-off is covered with the semi-solid state insulation member. As a result, the contact of the conductor cut-off portion to other member is restricted. According to the present invention, the conductor cut-off portion is not exposed.

In the present invention, the semi-solid state refers to a state called a jelly state, a gel state, a grease state, a paste state or the like. Furthermore, the semi-solid state refers to a condition of being able to remain in the cut-off portion or the cut-off facilitating portion in the conductor. In the present invention, the insulation member of the semi-solid state is called a semi-solid state insulation member.

Preferably, the cut-off facilitating portion is a conductive portion of the conductor on which a groove is formed.

Preferably, the cut-off facilitating portion is a conductive portion of the conductor on which a notch is formed.

Preferably, the cut-off facilitating portion is a conductive portion of the conductor in which a through hole is formed.

Preferably, the cut-off facilitating portion is a conductive portion of the conductor having a thin portion thinner than the first and second conductive portions.

According to the present invention, there is also provided a wire harness including a plurality of conductive paths each having the conductive path structure.

According to the above configuration, since the wire harness includes the plurality of conductive paths having a structure in which the first and second conductive portions are not exposed, even when the conductor is cut off, the stability is ensured.

Advantageous Effects of Invention

According to the above configuration, an effect is exhibited in which the exposure of the conductor cut-off portion of the conductor can be prevented by the semi-solid state insulation member even when the conductor is cut off or the like. Furthermore, according to the present invention, since the exposure of the conductor cut-off portion can be prevented, an effect is exhibited in which the stability is ensured.

According to the above configuration, an effect is exhibited in which the wire harness having high stability can be provided.

BRIEF DESCRIPTION OF DRAWINGS

FIG. 1A is a schematic diagram that shows an arrangement example of the wire harness, and FIG. 1B is a schematic diagram that shows the conductive path structure in the wire harness end portion.

FIG. 2A is a cross-sectional view taken from lines A-A of FIGS. 1A and 1B, and FIG. 2B is a cross-sectional view taken from lines B-B of FIGS. 1A and 1B.

FIG. 3A is an enlarged perspective view of the cut-off facilitating portion, and FIGS. 3B and 3C are enlarged perspective views of a modified example.

FIGS. 6A and 6B are exploded perspective views of FIG. 5, FIG. 6A is an exploded perspective view of a wire harness and shield case assembly, and FIG. 6B is an exploded perspective view of the shield case assembly.

DESCRIPTION OF EMBODIMENTS

The wire harness includes a plurality of conductive paths. The conductive path has a cuttable portion, and the outside of the cuttable portion is covered with a semi-solid state insulation member. Since the outside of the cuttable portion is covered with the semi-solid state insulation member, even when the conductive path is cut off or the like, the outside of the conductor cut-off portion of the conductive path entering a divided state by the cut-off is also covered with the semi-solid state insulation member, whereby the electrical contact of the conductor cut-off portion is restricted.

Figure 1A:
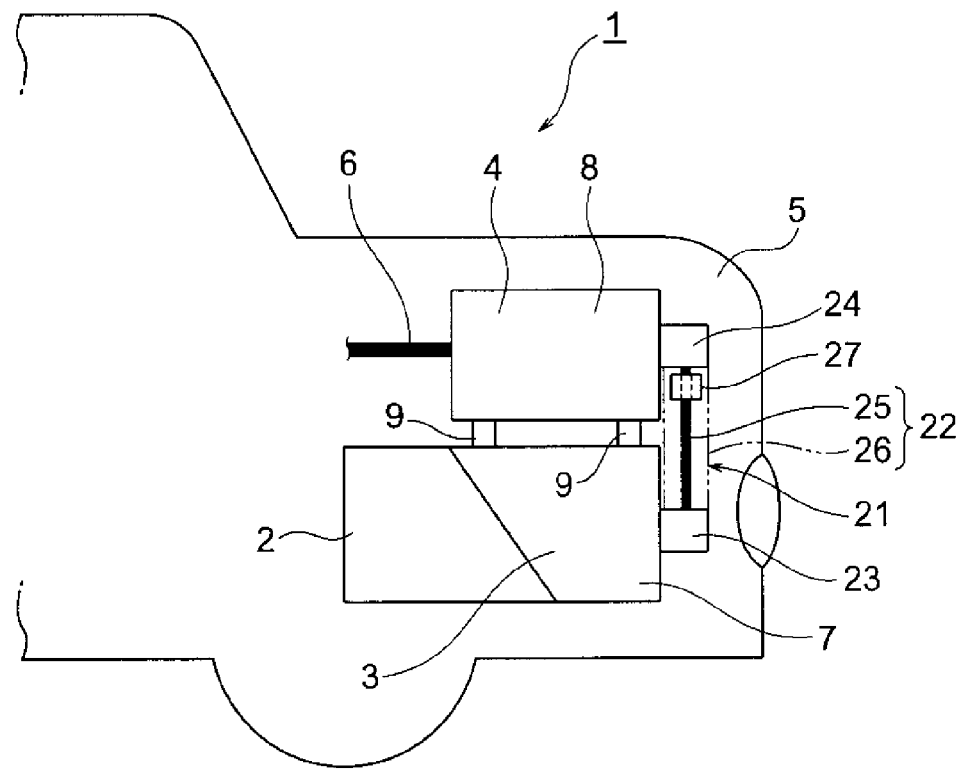
FIGS. 1A and 1B are diagrams that show a conductive path structure and a wire harness of an Example 1.
Figure 1B:
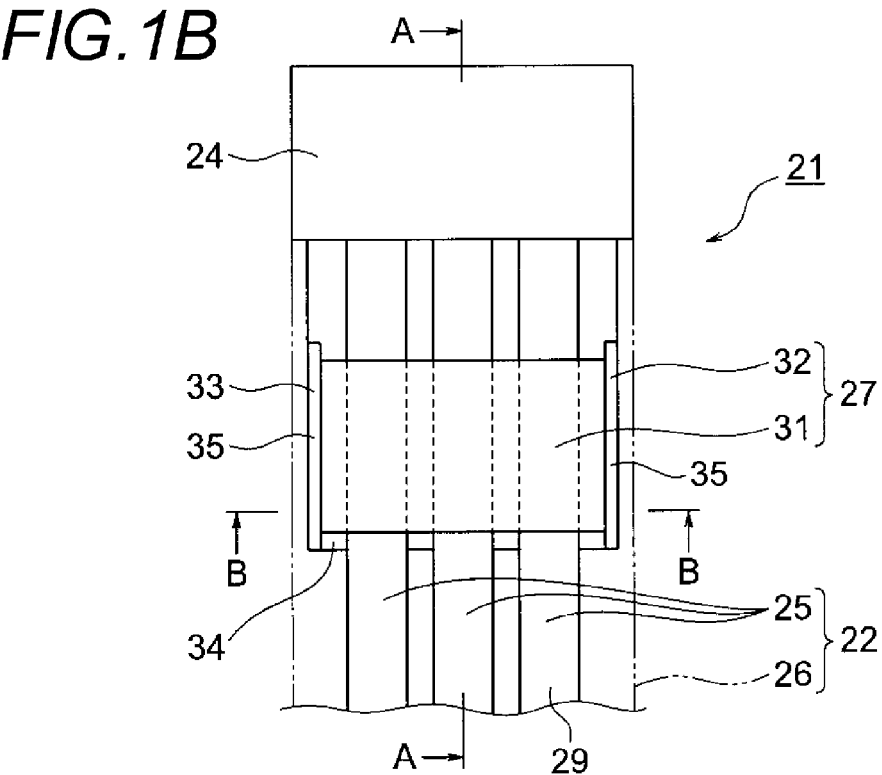
Figure 2A:
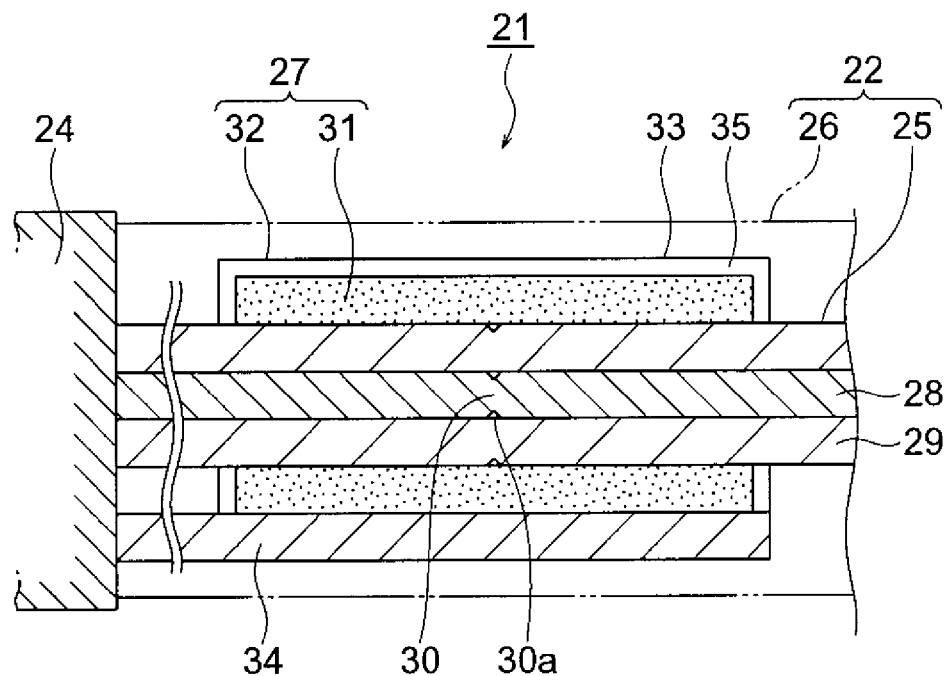
FIGS. 2A and 2B are cross-sectional views that show the conductive path structure.
Figure 2B:
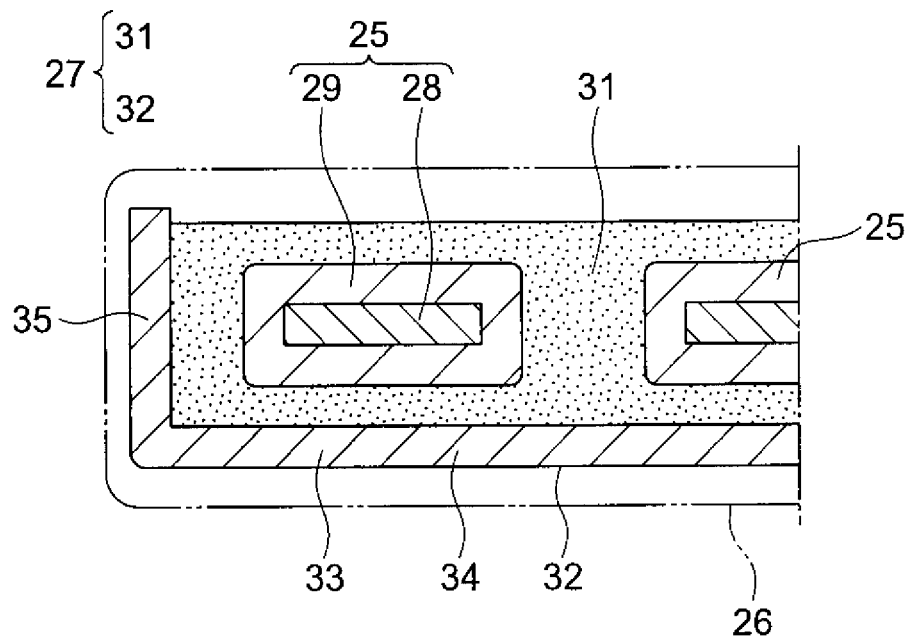
Figure 3A:
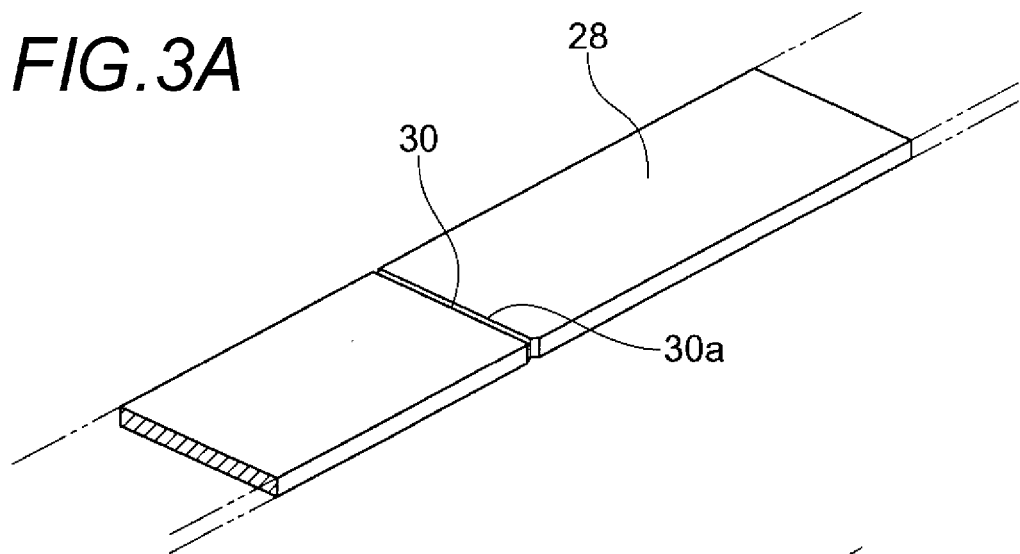
FIGS. 3A to 3C are diagrams that show a cuttable portion of the conductor.
Figure 3B:
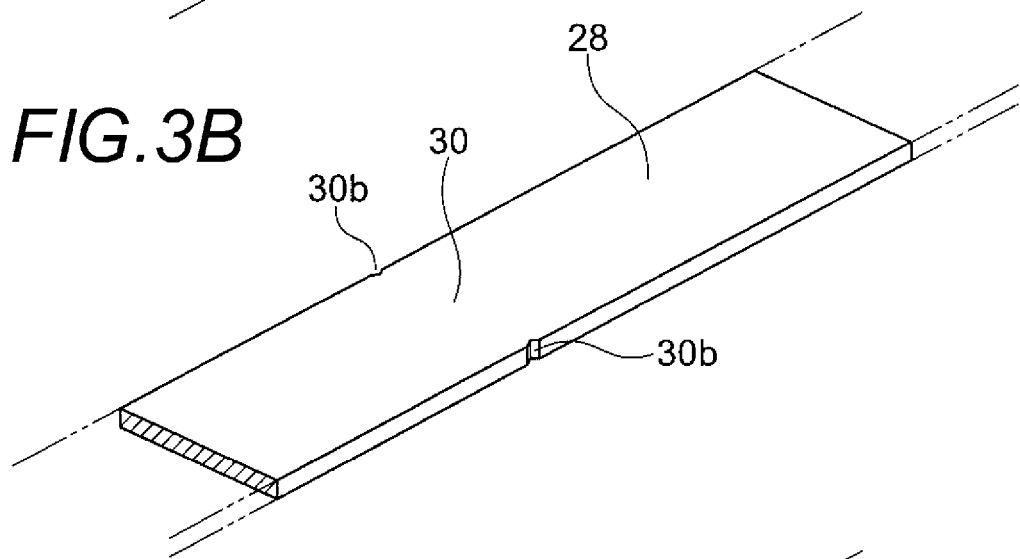
Figure 3C:
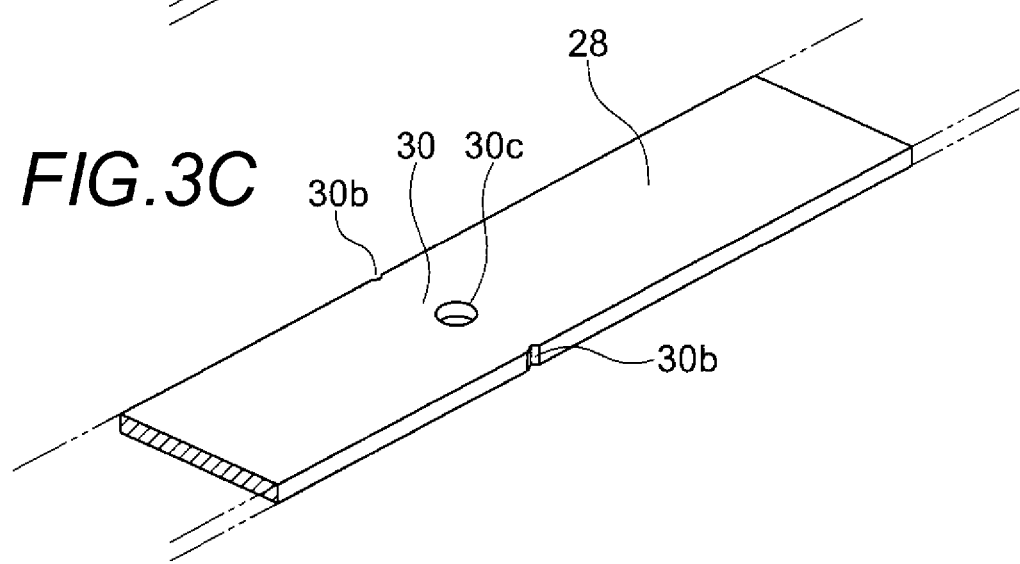
Figure 4:
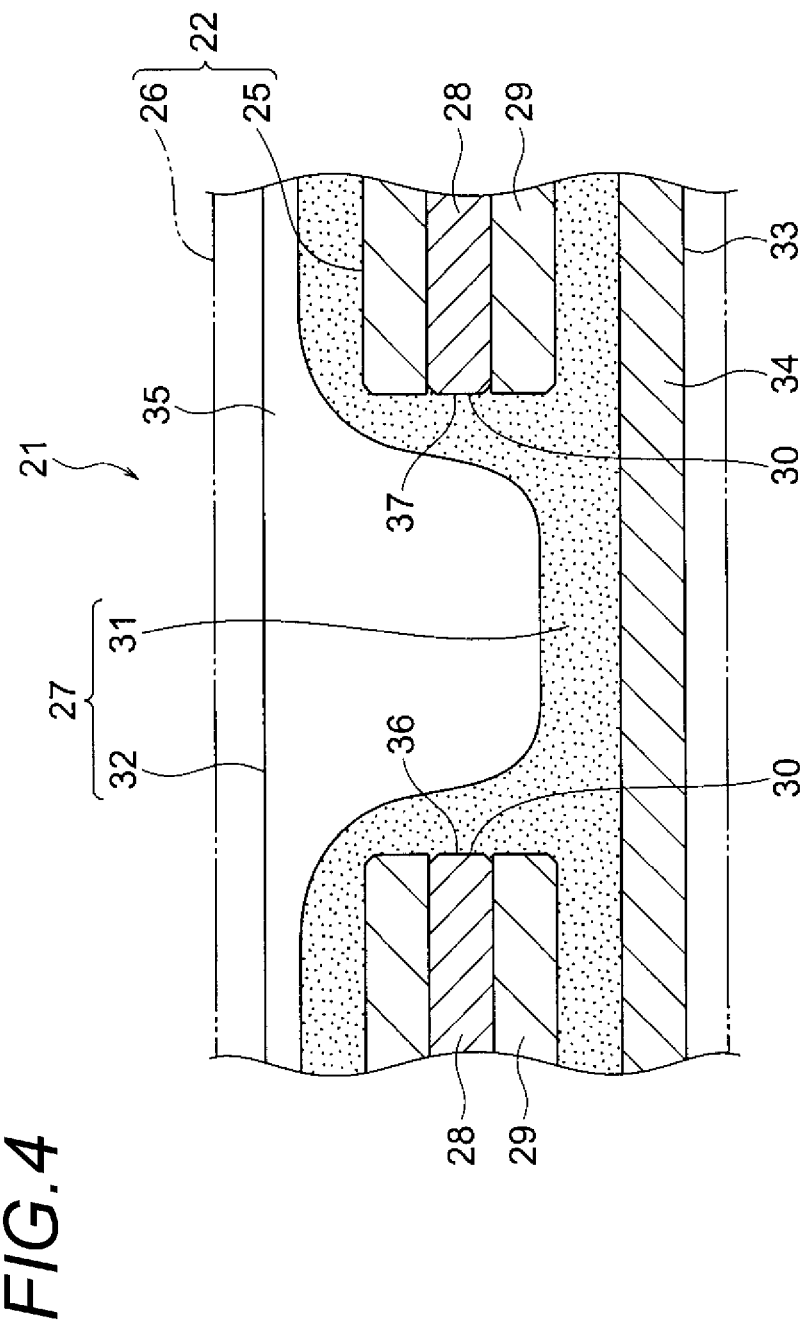
FIG. 4 is a cross-sectional view that shows a cut-off state of the conductive path.

Hereinafter, the Example 1 will be described with reference to the drawings. FIGS. 1A and 1B are diagrams that show the conductive path structure and the wire harness of the present invention. Furthermore, FIGS. 2A and 2B are cross-sectional views that show the conductive path structure, FIGS. 3A to 3C are diagrams that show the cuttable portion of the conductor, and FIG. 4 is a cross-sectional view that shows the cut-off state of the conductive path.

EXAMPLE 1

The wire harness of the present invention is aimed at being placed in a hybrid motor vehicle or an electric motor vehicle. Hereinafter, the hybrid motor vehicle will be described as an example (even in the case of the electric motor vehicle, the configuration, the structure and the effect of the wire harness of the present invention are basically identical. Furthermore, the present invention can be applied to a normal motor vehicle or the like without being limited to the hybrid motor vehicle or the electric motor vehicle).

In FIG. 1A, reference numeral 1 indicates a hybrid motor vehicle. The hybrid motor vehicle 1 is a vehicle that mixes and is driven by power of an engine 2 and a motor unit 3. Electric power from a battery (a battery pack) (not shown) is supplied to the motor unit 3 via an inverter unit 4. The engine 2, the motor unit 3, and the inverter unit 4 are installed (mounted) in an engine room 5 of a position where a front wheel or the like exists in this example. Furthermore, the battery (not shown) is installed (mounted) in a motor vehicle interior existing on the rear part of the engine room 5, or a motor vehicle rear portion in which a rear wheel or the like is present.

The motor unit 3 and the inverter unit 4 are connected to each other by a wire harness 21 of the present invention becoming high voltage. Furthermore, the battery (not shown) and the inverter unit 4 are connected to each other by a high voltage wire harness 6. The wire harness 6 is arranged from the engine room 5 to the bottom floor, for example, becoming a ground side of a floor panel.

Herein, a supplementary description will be made on this example. The motor unit 3 includes a motor and a generator. Furthermore, the inverter unit 4 includes an inverter and a converter. The motor unit 3 is formed as a motor assembly including a shield case 7. Furthermore, the inverter unit 4 is also formed as an inverter assembly including a shield case 8. The battery (not shown) is a Ni-MH-based battery or a Li-ion-based battery and is formed in a module shape. Furthermore, for example, it is also possible to use an electricity storage device such as a capacitor. The battery (not shown) is not particularly limited as long as it can be used in the hybrid motor vehicle 1 or the electric motor vehicle.

The inverter unit 4 is placed and fixed immediately over the motor unit 3 in this example. That is, the inverter unit 4 and the motor unit 3 are placed so as to come into close contact with each other. Due to such an installation state, the wire harness 21 is shortened. Concerning the inverter unit 4 and the motor unit 3, reference numeral 9 indicates a fixed leg portion for placing and fixing the inverter unit 4 immediately over the motor unit 3.

In FIGS. 1A, 1B, 2A and 2B, the wire harness 21 includes a harness main body 22, a motor side connector 23 provided in one end of the harness main body 22, and an inverter side connector 24 provided in the other end of the harness main body 22. The harness main body 22 includes a plurality (herein, three) of high voltage conductive paths 25 (conductive paths) aligned on approximately the same plane at predetermined intervals, and an electromagnetic shield member 26 that collectively covers the plurality of high voltage conductive paths 25. In the configuration mentioned above, the wire harness 21 further includes an insulation member 27 that covers the outside of the cuttable portion of the high voltage conductive path 25. The insulation member 27 includes a semi-solid state insulation portion 31 described later.

The electromagnetic shield member 26 is a member for exhibiting an electromagnetic shield function, and is configured by, for example, forming a braid or a metal foil in a cylinder shape. The electromagnetic shield member 26 is formed to have a length that covers the motor side connector 23 and the inverter side connector 24 in this example.

The motor side connector 23 is inserted into the shield case 7 of the motor unit 3, and the inner portion thereof is electrically connected. Furthermore, similarly, the inverter side connector 24 is also inserted into the shield case 8 of the inverter unit 4, and the inner portion thereof is electrically connected.

The high voltage conductive path 25 includes a conductor 28, and an insulator 29 that covers the conductor 28. The conductor 28 is formed by pressing a metal plate (that is made of copper, copper alloy or aluminum) having conductivity in this example. That is, the conductor 28 is formed in a bus bar (a band plate shape) shape having a predetermined conductor width and thickness.

Furthermore, the conductor 28 is not limited to the bus bar shape. For example, a conductor may be a conductor structure formed by twisting the strand, or a conductor structure (for example, a conductor structure formed of a straight angle single core or a circular single core) rod shape having a section of a rectangular shape or a round shape may be adopted. The conductor 28 is not particularly limited as long as it can be provided in a cut-off facilitating portion 30 described later, that is, if a cuttable portion is provided. In a predetermined position of the conductor 28, the cut-off facilitating portion 30 is provided (the placement is an example. In this example, the cut-off facilitating portion 30 is provided in a position close to the inverter side connector 24).

The cut-off facilitating portion 30 is provided in a cuttable portion (corresponding to the cuttable portion of the high voltage conductive path 25) in the conductor 28. Furthermore, for example, when external force such as a collision is applied, the cut-off facilitating portion 30 is provided as a portion that is cut off right ahead in the conductor 28.

The cut-off facilitating portion 30 is configured that a groove 30a is formed over the whole periphery of a bus bar as shown in FIG. 3A, that a V shaped groove or a U shaped groove is formed in a plane portion of the bus bar although it is not shown, that the notch 32b is formed in both side portions of the bus bar as shown in FIG. 3B, that both of the notch 30b and the hole 30c penetrating a plane portion of the bus bar as shown in FIG. 3C, that the bus bar plane portion is pressed so as to be a thinly form, although it is not particularly shown or the like.

The insulator 29 is a portion that presses and covers the resin material having the insulation property to the outside of the conductor 28 or is formed by over-molding elastomer to the outside of the conductor 28. Herein, the latter is adopted as the insulator 29.

The insulation member 27 is configured as a member that can prevent the exposure of the conductor cut end portions 36 and 37 described later or can prevent the exposure to ensure the stability, even when the high voltage conductive path 25 is cut off or the like. The insulation member 27 includes a semi-solid state insulation portion 31 and the installation member 32 in this example.

Firstly, the installation member 32 will be described. The installation member 32 is formed in a shape in which one end thereof is fixed to the inverter side connector 24. Concerning the one end side fixing structure, it is of course possible to adopt a general fixing structure due to the locking protrusion, and a structure may be adopted which is integrally molded in the housing of the inverter side connector 24.

In the other end of the installation member 32, an accommodation holding portion 33 relative to the solid-state insulation member 31 is formed. Although it is not particularly limited, the accommodation holding member 33 is formed in a shown shape having a bottom portion 34 and a pair of side walls 35 (a case of a shape having a ceiling wall may be adopted). The shape of the accommodation holding portion 33 is not particularly limited, as long as the semi-solid state insulation portion 31 can be accommodated, or as long as it does not disturb the arrangement of three high voltage conductive paths 25. The accommodation holding portion 33 is placed so as to match the cuttable portion in the conductor 28. The bottom wall 34 is formed so as to be extended to one end of the installation member 32.

The semi-solid state insulation portion 31 is a portion of a semi-solid state having the insulation property and is formed in a gel (jelly) state and an approximately rectangular shape although it is not particularly limited. The semi-solid state insulation portion 31 is formed so that the cuttable portions (cut-off facilitating portions) of the three high voltage conductive paths 25 can be buried thereinto, in other words, so that it can cover the whole outside of the cuttable portion. The semi-solid state insulation portion 31 is formed by the use of a material that can remain in the cut-off portion even when the high voltage conductive path 25 is cut off.

Next, an operation of the wire harness 21, when the collision occurs in the hybrid motor vehicle 1 (see FIG. 1A), will be described based on the configuration and the structure mentioned above.

In FIG. 1A, when considering a case where the collision occurs in the hybrid motor vehicle 1, the inverter unit 4 is, for example, moved rearward with respect to the engine 1 and the motor unit 3. Since the wire harness 21 is connected to the motor unit 3 and the inverter unit 4, when the inverter unit 4 is moved rearward, the impact, which pulls the wire harness 21 itself, is applied to the wire harness 21.

When the impact such as the collision is applied to the wire harness 21, the force is applied to the cuttable portions of three high voltage conductive paths 25 specifically, the cut-off facilitating portion 30 of the conductor 28, whereby the conductor 28 is cut off as shown in FIG. 4. At this time, the conductor 28 is divided into the one conductor cut end portion 36 and the other conductor cut end portion 37 (the conductor cut-off portion). When the conductor 28 is cut and divided in the position of the cut-off facilitating portion 30, since the semi-solid state insulation portion 31 is present at the outside of the one conductor cut end portion 36, the electrical connection is hereby restricted. Furthermore, since the semi-solid state insulation portion 31 is also present at the outside of the other conductor cut end portion 37, the electrical connection is restricted.

As mentioned above, as described with reference to FIGS. 1A to 4, according to the present invention, an effect is exhibited in which the exposure of the conductor cut end portions 36 and 37 can be prevented by the presence of the semi-solid state insulation portion 31, even when the high voltage conductive path 25 is cut off or the like. Thus, an effect is exhibited in which the stability can be ensured. In addition, according to the present invention, an effect is exhibited in which the wire harness 21 having high stability can be provided.

EXAMPLE 2

Figure 5:
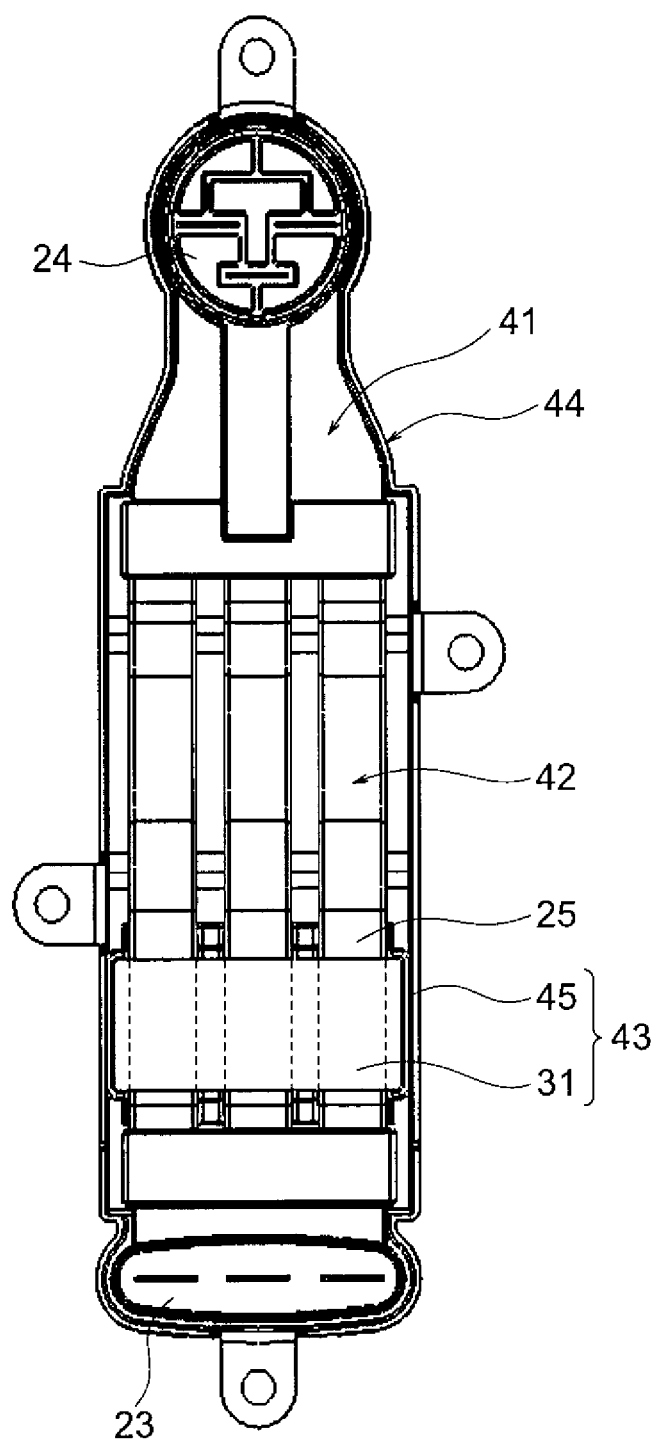
FIG. 5 is a diagram that shows a conductive path structure and a wire harness of another example of an Example 2.

Hereinafter, an example 2 will be described with reference to the drawings. FIG. 5 is a diagram that shows a conductive path structure and a wire harness of the present invention which is another example. Furthermore, FIGS. 6A and 6B are exploded perspective views of FIG. 5. Furthermore, the same components as the Example 1 are denoted by the same reference numerals and the detailed description thereof will be omitted.

In FIGS. 5, 6A and 6B, a wire harness 41 includes a harness main body 42, a motor side connector 23 provided at one end of the harness main body 42, and an inverter side connector 24 provided at the other end of the harness main body 42. The harness main body 42 includes a plurality (herein, three) of high voltage conductive paths 25 aligned on an approximately same plane at predetermined intervals. In addition to such a configuration, the wire harness 41 further includes an insulation member 43 that covers the outside of the cuttable portion of the high voltage conductive path 25. The insulation member 43 is fixed to the electromagnetic shield member 44 that covers the wire harness 41.

The insulation member 43 is configured as a member that can prevent the exposure of the conductor cut end portions 36 and 37 (see FIG. 4) and can prevent the exposure to ensure the stability, even when the high voltage conductive path 25 is cut off or the like. The insulation member 43 includes a semi-solid state insulation portion 31 and the installation member 45 in this example. The installation member 45 is formed in a shape that can accommodate and hold the semi-solid state insulation portion 31. A fixing locking protrusion 46 is formed in the installation member 45.

The electromagnetic shield member 44 is a member for exhibiting the electromagnetic shield function, and is formed by pressing the metal thin plate having the conductivity in a cover shape. In the electromagnetic shield member 44, a locking portion 47 is formed which locks the installation member 45 of the insulation member 43.

As mentioned above, as described with reference to FIGS. 5, 6A and 6B, according to the present invention, similar to the Example 1, en effect is exhibited in which the exposure of the conductor cut end portions 36 and 37 (see FIG. 4) can be prevented by the presence of the semi-solid state insulation portion 31. Thus, an effect is exhibited in which the stability can be ensured. In addition, according to the present invention, an effect is exhibited in which the wire harness 41 having high stability can be provided.

Furthermore, in this example, since the insulation member 43 including the semi-solid state insulation portion 31 is fixed to the metallic electromagnetic shield member 44, by maintaining a heat-absorbing property in the semi-solid state insulation portion 31, it is possible to transmit heat generated in the wire harness 41 to the electromagnetic shield member 44. Thus, in this case, an effect is exhibited in which the wire harness 41 having high heat dissipation can be provided.

In addition, various modifications can also be made in the present invention within the scope not changing the main gist of the present invention.

In the description mentioned above, the wire harness has the cuttable portion in the conductive path, and the outside of the cuttable portion is covered with the semi-solid state insulation member. However, for example, when the cuttable portion is accommodated in the housing, only the conduction cut-off portion of the conductive path divided by the cut-off may be a structure that is covered with the semi-solid state insulation member. To sum up the characteristic, "with respect to the cuttable portion of the conductive path having the conductor, the outside of the conductor cut end portion divided upon cutting the cuttable portion is covered with the semi-solid state insulation member".

The present application is based on Japanese Patent Application No. 2010-207548 filed on Sep. 16, 2010, the contents of which are incorporated herein by reference.

Industrial Applicability

A conductive path structure and a wire harness capable of ensuring stability even when the conductive path is cut off can be provided.

REFERENCE SIGNS LIST 1 hybrid motor vehicle
2 engine
3 motor unit
4 inverter unit
5 engine room
6 wire harness
7, 8 shield case
9 fixed leg portion
21 wire harness
22 harness main body
23 motor side connector
24 inverter side connector
25 high voltage conductive path (conductive path)
26 electromagnetic shield member
27 insulation member
28 conductor
29 insulator
30 cut-off facilitating portion
31 semi-solid state insulation portion
32 installation member
33 accommodation holding portion
34 bottom wall
35 side wall
36 one conductor cut end portion (conduction cut-off portion)
37 other conductor cut end portion (conduction cut-off portion)
41 wire harness
42 harness main body
43 insulation member
44 electromagnetic shield member
45 installation member
46 locking protrusion
47 locking portion

The invention claimed is:

1. A conductive path structure comprising:
a conductor that includes a first conductive portion and a second conductive portion which are connected to each other through a cut-off facilitating portion; and
a semi-solid state insulation member that is in a semi-solid state and covers the cut-off facilitating portion,
wherein when the cut-off facilitating portion is cut off so as to separate the first conductive portion and the second conductive portion to each other due to an impact applied to the cut-off facilitating portion, the semi-solid state insulation member covers end portions of the separated first conductive portion and the separated second conductive portion which are close to the cut-out facilitating portion.

2. The conductive path structure according to claim 1, wherein the cut-off facilitating portion is a conductive portion of the conductor on which a groove is formed.

3. The conductive path structure according to claim 1, wherein the cut-off facilitating portion is a conductive portion of the conductor on which a notch is formed.

4. The conductive path structure according to claim 1, wherein the cut-off facilitating portion is a conductive portion of the conductor in which a through hole is formed.

5. The conductive path structure according to claim 1, wherein the cut-off facilitating portion is a conductive portion of the conductor having a thin portion thinner than the first and second conductive portions.

6. A wire harness including a plurality of conductive paths each having the conductive path structure according to claim 1.

* * * * *